(12) United States Patent
Boyd (10) Patent No.: US 11,874,560 B2
(45) Date of Patent: Jan. 16, 2024

(54) BACKLIGHT FOR UNIFORM ILLUMINATION

(71) Applicant: 3M INNOVATIVE PROPERTIES COMPANY, St. Paul, MN (US)

(72) Inventor: Gary T. Boyd, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 50 days.

(21) Appl. No.: 17/597,398

(22) PCT Filed: Jul. 23, 2020

(86) PCT No.: PCT/IB2020/056975
§ 371 (c)(1),
(2) Date: Jan. 5, 2022

(87) PCT Pub. No.: WO2021/024078
PCT Pub. Date: Feb. 11, 2021

(65) Prior Publication Data
US 2022/0269136 A1 Aug. 25, 2022

Related U.S. Application Data

(60) Provisional application No. 62/882,064, filed on Aug. 2, 2019.

(51) Int. Cl.
*G02F 1/13357* (2006.01)
*G02F 1/1335* (2006.01)

(52) U.S. Cl.
CPC .... *G02F 1/133611* (2013.01); *G02F 1/13362* (2013.01); *G02F 1/133536* (2013.01);
(Continued)

(58) Field of Classification Search
CPC ......... G02F 1/133611; G02F 1/133536; G02F 1/133603; G02F 1/133605; G02F 1/133607; G02F 1/13362
(Continued)

(56) References Cited

U.S. PATENT DOCUMENTS

2001/0008464 A1 7/2001 Ouderkirk
2011/0134623 A1 6/2011 Sherman
(Continued)

OTHER PUBLICATIONS

International Search report for PCT International Application No. PCT/IB2020/056975 dated Sep. 8, 2020, 3 pages.

*Primary Examiner* — Charles S Chang
(74) *Attorney, Agent, or Firm* — Clifton F. Richardson; Robert S. Moshrefzadeh (57) ABSTRACT

A backlight for providing uniform illumination to a display panel includes a plurality of discrete light sources. A multilayer polymeric partial reflector is disposed on the plurality of discrete light sources. For substantially normally incident light the partial reflector includes a reflection band includes a blue wavelength, a reflectance greater than about 80% at the blue wavelength, a left band edge between about 370 nm to about 420 nm, a right band edge between about 500 nm and 600 nm, and an average transmission between about 20% to about 80% for visible wavelengths greater than the right band edge. A reflective polarizer is disposed on the partial reflector. For substantially normally incident light having the blue wavelength, the reflective polarizer reflects at least 60% of the light having the first polarization state and transmits at least 60% of the light having the second polarization state.

17 Claims, 5 Drawing Sheets

(52) U.S. Cl.
CPC .. *G02F 1/133603* (2013.01); *G02F 1/133605* (2013.01); *G02F 1/133607* (2021.01)

(58) Field of Classification Search
USPC .................................................. 349/61–68
See application file for complete search history.

(56) References Cited

U.S. PATENT DOCUMENTS

| | | | |
|---|---|---|---|
| 2014/0240981 A1* | 8/2014 | Weber | G02B 6/0096 362/235 |
| 2018/0039012 A1 | 2/2018 | Shin | |
| 2021/0026202 A1* | 1/2021 | Nam | G02F 1/133609 |

* cited by examiner

BACKLIGHT FOR UNIFORM ILLUMINATION

TECHNICAL FIELD

The disclosure generally relates to backlit illumination systems, specifically to a backlight for providing uniform illumination to a display panel.

BACKGROUND

Optical displays are commonly used in billboards, televisions, laptop and desktop computers, hand-held devices such as mobile telephones, and other applications. A widely-used type of display is the liquid crystal display (LCD). Because LCDs do not create light themselves, they require a source of illumination—either reflected ambient light, or more commonly, light from a backlight. The backlight generally includes an illumination device, which may include light sources such as light emitting diodes or fluorescent lamps, and a number of light management films between the illumination device and the LCD panel. In general, the light management films enhances the operation of a display by promoting more efficient and effective use of light.

SUMMARY

In some aspects of the disclosure, a backlight for providing uniform illumination to a display panel is provided. The backlight includes a plurality of discrete light sources forming an array of rows and columns of discrete light sources. Each discrete light source is configured to emit an unpolarized blue light at a blue wavelength in a range from about 410 nm to about 470 nm. A multilayer polymeric partial reflector is disposed on the plurality of discrete light sources. For substantially normally incident light and for each of orthogonal first and second polarization states the partial reflector includes a reflection band including the blue wavelength, a reflectance greater than about 80% at the blue wavelength, a left band edge between about 370 nm to about 420 nm, and a right band edge between about 500 nm and 600 nm, and an average transmission between about 20% to about 80% for visible wavelengths greater than the right band edge. A reflective polarizer is disposed on the partial reflector. For substantially normally incident light having the blue wavelength, the reflective polarizer reflects at least 60% of the light having the first polarization state and transmits at least 60% of the light having the second polarization state.

BRIEF DESCRIPTION OF DRAWINGS

The various aspects of the disclosure will be discussed in greater detail with reference to the accompanying figures where, FIG. 1 schematically illustrates a backlight illumination system for providing illumination to a display panel according to some embodiments of the disclosure.

The figures are not necessarily to scale. Like numbers used in the figures refer to like components. However, it will be understood that the use of a number to refer to a component in a given figure is not intended to limit the component in another figure labelled with the same number.

DETAILED DESCRIPTION OF ILLUSTRATIVE EMBODIMENTS

In the following description, reference is made to the accompanying drawings that form a part hereof and in which various embodiments are shown by way of illustration. It is to be understood that other embodiments are contemplated and may be made without departing from the scope or spirit of the present description. The following detailed description, therefore, is not to be taken in a limiting sense.

Display panels, such as, for instance, Liquid Crystal Displays (LCD), often utilize a backlight arrangement that is desired to be efficient and spatially, angularly, and spectrally uniform. One method of illumination utilizes a row of discrete light sources such as LEDs and a lightguide to spread the light uniformly over the area of the display. These LEDs are oriented to emit across the plane of the backlight arrangement. Another method uses LEDs arranged as an array across the plane of the backlight arrangement. These LEDs emit perpendicular to the plane of the backlight toward the display panel. LEDs arranged in an array provide brightness control over each or groups of LEDs to dynamically vary the illumination in coordination with the display panel image. Backlighting technique is an effective means to provide a wide range of brightness for independent regions of the display and improves the user visual experience. Backlighting methods generally utilize additional optics to achieve the uniformity and brightness specifications. It is often desired that backlighting arrangements have a minimal total thickness of the backlight components. Embodiments described herein address these and other challenges that effectively and uniformly spreads light in the plane of the backlight arrangement.

Figure 1:
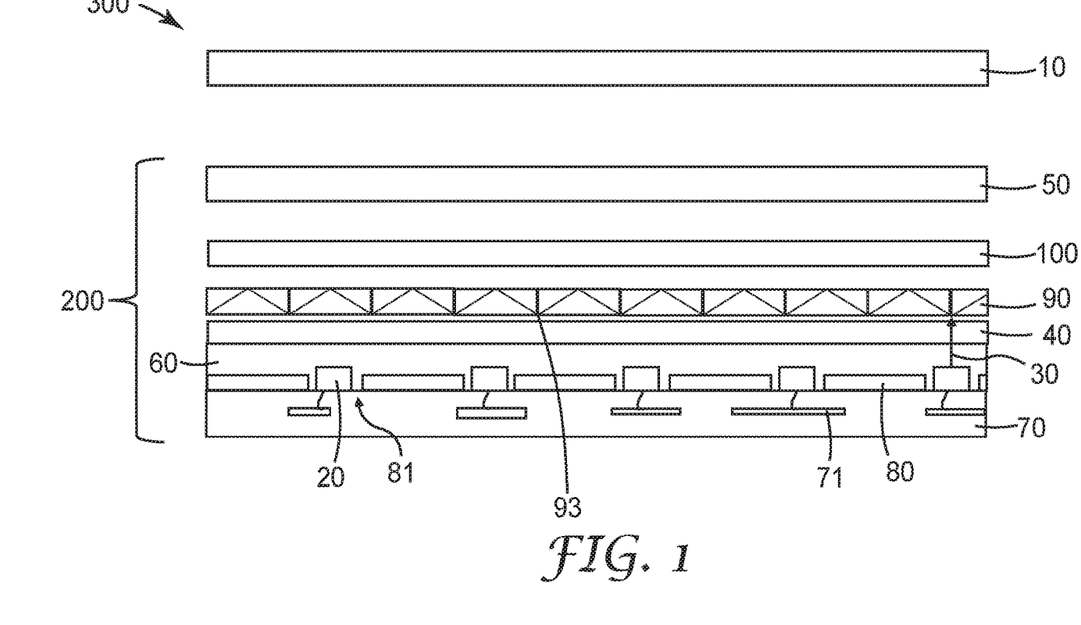
Figure 3:
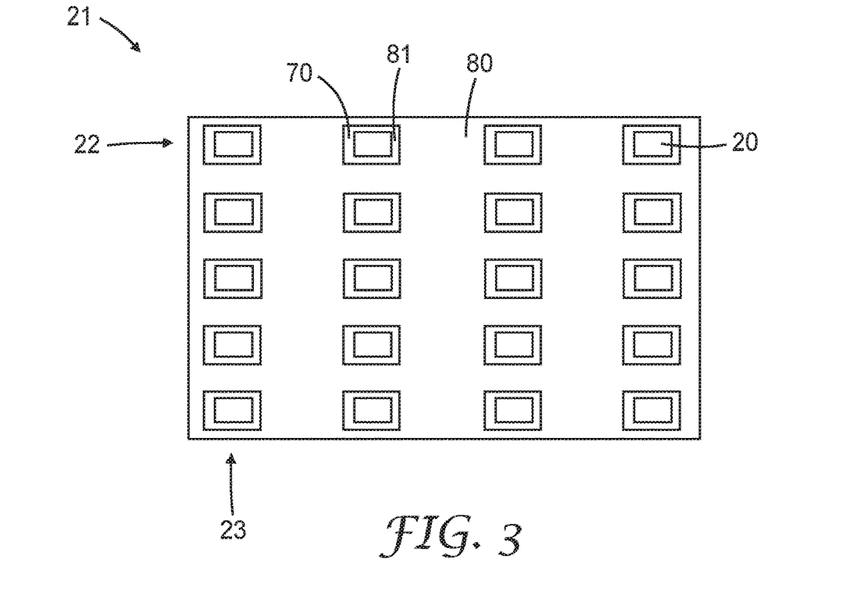
FIG. 3 schematically shows the arrangement of discrete light sources in an array according to some aspects of the disclosure.

As schematically illustrated in FIG. 1, an illuminated display system (300) includes a display panel (10) and a backlight (200) for providing uniform illumination to the display panel (10). In some embodiments, the display panel (10) may be a liquid crystal display (LCD) panel. The backlight (200) includes a plurality of discrete light sources (20) forming an array (21) of rows (22) and columns (23) of discrete light sources (20) as best seen in FIG. 3. In some aspects, the array (21) may be formed by placing the light sources (20) in a square pattern or in any rectangular pattern as desired. The actual number of light sources needed depends on the size of the display, the luminous flux of each light source, and the desired brightness. In some aspects, the plurality of discrete light sources (20) includes a plurality of discrete light emitting diodes (LEDs). The LEDs that form the array of discrete light sources (20) are in electrical communication such that the LEDs can operate in a series or parallel manner or a combination of series and parallel as desired. In some embodiments the plurality of discrete light sources may be a row of discrete light sources such as LEDs. Arrangements of LEDs in an array may provide better brightness control over each or groups of LEDs to dynamically vary the illumination in coordination with the LCD panel image.

In some aspects, the plurality of discrete light sources (20), such as LEDs, may vary in width from 10 µm to 10 mm. The LEDs may be spaced apart by a pitch that can vary from 1 mm to 10 mm. For portable displays the LED width may be about 100-300 µm, and the pitch may be about 1-10 mm. LEDs may include LED dies, or encased or encapsulated semiconductor devices marketed as "LEDs", may be conventional or super radiant variety, and may be forward-emitting or side-emitting variety. The LED die may be configured for surface mount, chip-on-board, flip chip, or other known mounting configurations.

In some embodiments, the plurality of discrete light sources (20) are disposed on a circuit board (70). The array (21) of light sources (20) may be mounted on the circuit board by any technique such as, for example, mechanical fastening, soldering, or using adhesives. The circuit board (70) includes a plurality of electrically conductive traces (71) connected to the discrete light sources (20) for energizing and controlling a light emission of the discrete light sources (20).

In some embodiments, the backlight (200) includes a reflection layer (80). The reflection layer (80) may have high reflectivity and may be placed on the circuit board plane between the discrete light sources (20). In some aspects, the reflection layer has a reflectance of at least 60%, or at least 70%, or at least 80%, or, in some aspects, at least 90%, at the blue wavelength. High reflective materials may be used as the reflection layer (80), to achieve high recycling efficiency. This becomes important when light management optical films are used, as will be explained below, since these films reflect the light which cannot be used in the first pass and recycled in order to contribute to the output of the display panel during subsequent pass or passes. The reflection layer (80) may be white resist, in some aspects. In some other aspects, the reflection layer (80) defines a plurality of through-openings (81), and each discrete light source (20) may be disposed in a corresponding opening (81) to allow light from each discrete light source to be transmitted.

Figure 2:
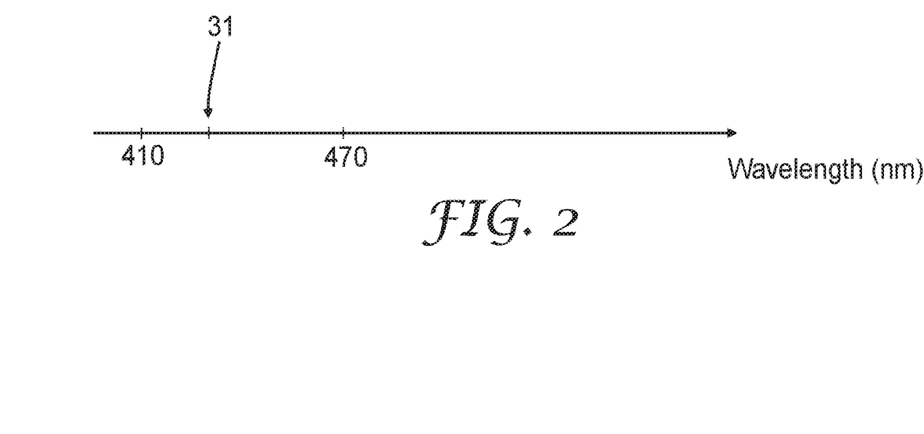
FIG. 2 schematically illustrates a blue wavelength range from about 410 nm to 470 nm.

Each discrete light source (20) is configured to emit an unpolarized blue light (30) at a blue wavelength (31) in a range from about 410 nm to about 470 nm as schematically shown in FIG. 2. In some embodiments, the blue wavelength (31) is in a range from about 430 nm to about 470 nm, say about 450 nm.

Figure 4:
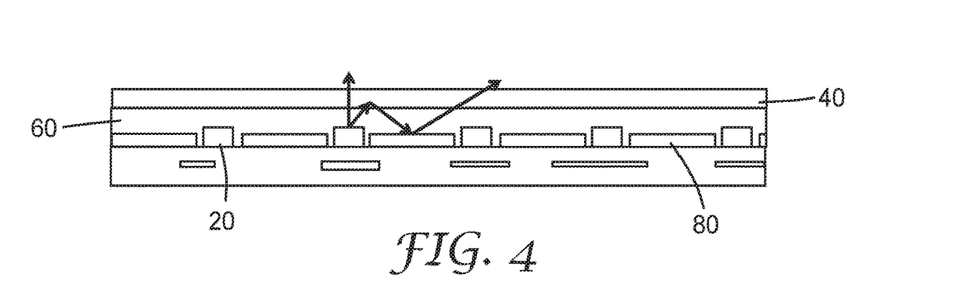
FIG. 4 schematically shows the propagation of light in a backlight illumination system according to certain aspects of the disclosure.

In some embodiments, a multilayer polymeric partial reflector (40) is disposed on the plurality of discrete light sources (20). Light from the plurality of discrete light sources (20) that is reflected by a partial reflector (40) reflects off the reflection layer (80), and may be transmitted by the partial reflector (40), as illustrated using arrows in FIG. 4. The light angle distribution of the output light transmitted by the partial reflector (40) would be a function of the emission light angle distribution of the LEDs, the diffuse reflectance of the reflection layer (80), and the transmissive and reflective properties of the partial reflector (40).

In some aspects, the multilayer polymeric partial reflector (40) may consist of a stack of alternating materials having in-plane refractive indices nx, ny. The partial reflector (40) may have high reflectivity for axially incident light (0°) between a Left Band Edge (LBE) lower wavelength, and a Right Band Edge (RBE) higher wavelength. Light incident at higher angles will experience a reflectance spectrum that is shifted toward lower wavelengths. If the wavelength of axially incident light is less than the RBE, it will normally be reflected. At some higher incidence angle, where the wavelength is above the shifted RBE, the light will be transmitted. By designing the multilayer polymeric partial reflector (40) and its resulting transmission spectrum, a narrow band light source can experience a higher transmittance at higher incident angle, while reflecting light at lower incidence angles thereby spreading light laterally and improving spatial uniformity.

Figure 5:
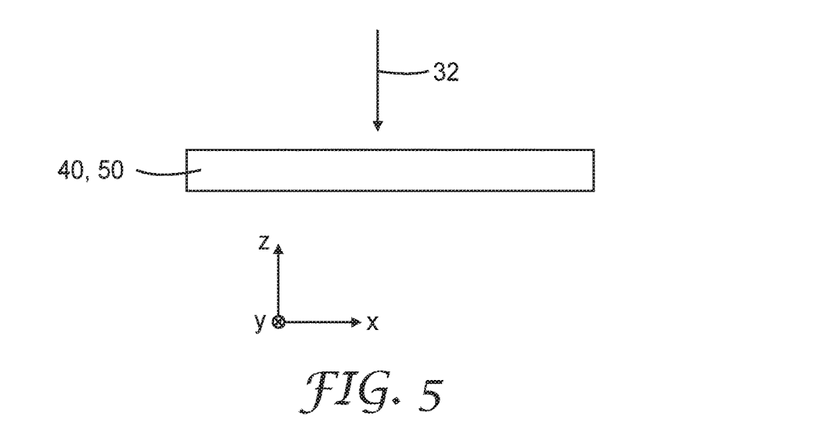
FIG. 5 schematically shows the normally incident light on the partial reflector and reflective polarizer according to some aspects of the disclosure.
Figure 6:
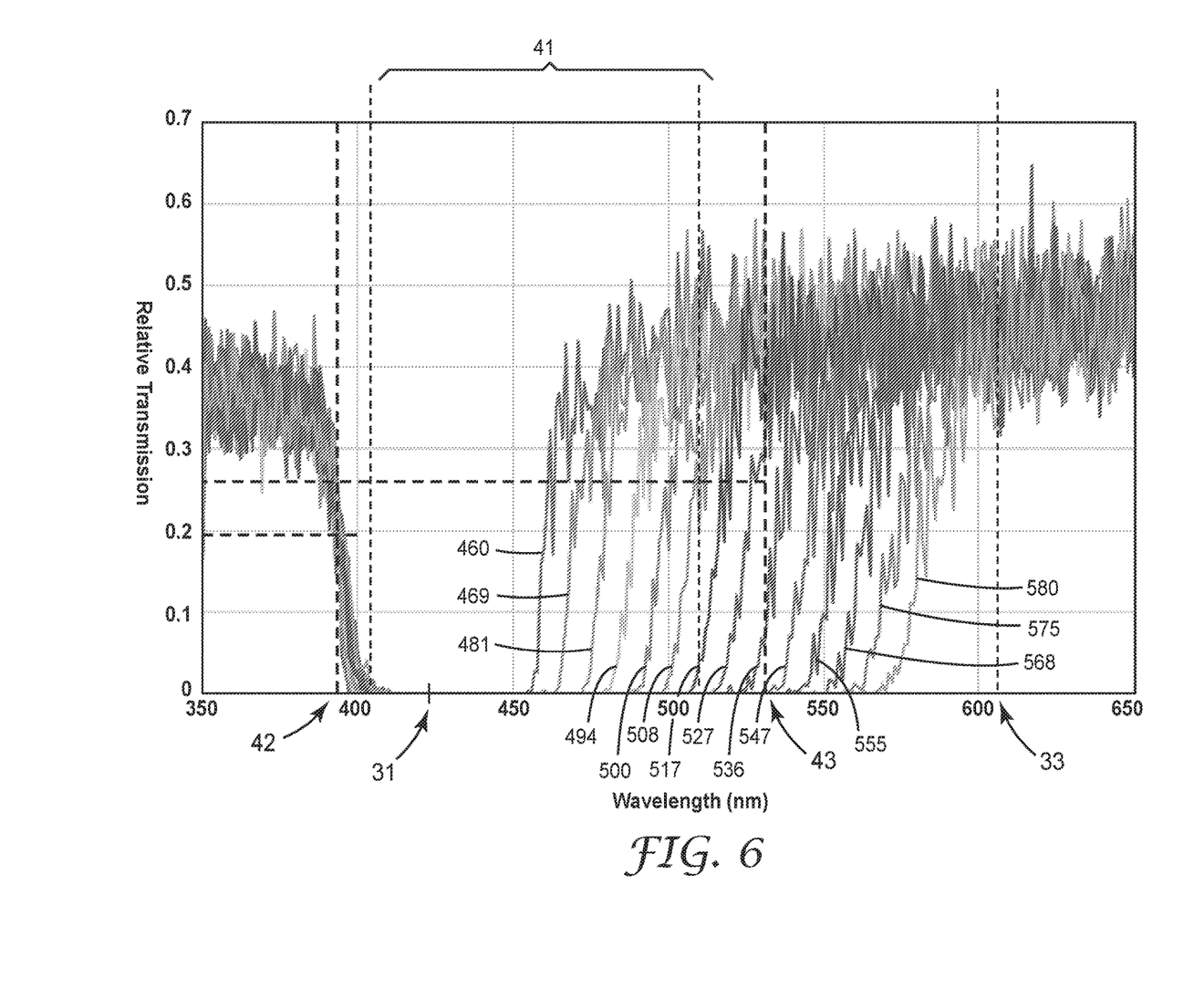
FIG. 6 is a graphical representation of the transmission spectra showing relative transmission of light at different wavelengths according to some aspects of the disclosure.

As graphically represented in FIG. 6, in some embodiments, for substantially normally incident light (32) (shown in FIG. 5) and for each of first (x-axis) and second (y-axis) polarization states orthogonal to each other, the partial reflector includes a reflection band (41) including the blue wavelength, and a reflectance greater than about 80% at the blue wavelength. The partial reflector (40) includes a left band edge (42) between about 370 nm to about 420 nm and a right band edge (43) between about 500 nm and 600 nm for substantially normally incident light (32) and for each of orthogonal first (x-axis) and second (y-axis) polarization states. Further, the partial reflector (40) includes an average transmission between about 20% to about 80% for visible wavelengths greater than the right band edge for substantially normally incident light (32) and for each of orthogonal first (x-axis) and second (y-axis) polarization states. The right band edge wavelength in nm is indicated for the various transmission curves in FIG. 6.

Figure 7:
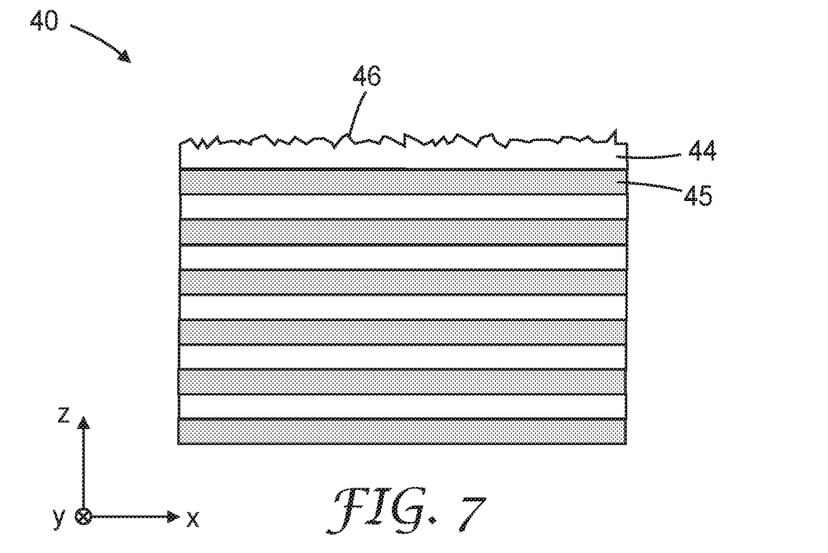
FIG. 7 schematically shows the construction of the partial reflector according to some aspects of the disclosure.

As shown in FIG. 7, in some embodiments, the multilayer polymeric partial reflector (40) may include a plurality of polymeric layers (44, 45). The polymeric layers (44, 45) may reflect or transmit light primarily by constructive or destructive optical interference. For instance, the polymeric layers (44, 45) may have different refractive index characteristics so that some light is reflected at interfaces between adjacent layers. The polymeric layers (44, 45) may be sufficiently thin so that light reflected at a plurality of interfaces undergoes constructive or destructive interference to give the multilayer polymeric partial reflector (40) the desired reflective or transmissive properties. In some embodiments, the polymeric layers include one or more of a polycarbonate, a polymethyl methacrylate (PMMA), a polyethylene terephthalate (PET), a glycol-modified polyethylene terephthalate (PETG), a polyethylene naphthalate (PEN), and a PEN/PET copolymer.

The reflective and transmissive properties of the multilayer polymeric partial reflector (40) are a function of the refractive indices of the respective polymeric layers (44, 45). Each layer can be characterized, at least in localized positions, by in-plane refractive indices nx, ny. These indices represent the refractive index of the subject material for light polarized along mutually orthogonal x-axis and y-axis, respectively. In some aspects, the plurality of polymeric layers form alternating first (44) and second (45) polymeric layers. The first polymeric layers (44) may be substantially isotropic, i.e., nx~ny. The second polymeric layers (45) may be substantially birefringent and, a different between in-plane indices nx and ny along orthogonal directions may be greater than about 0.02, or, in some instances, greater than about 0.05. For example, the polymeric layers (44, 45) may be designed using alternating layers of birefringent PEN and isotropic PMMA. Other combinations of high and low index materials may be used, such as alternating PET and PMMA layers.

In some aspects, the plurality of polymeric layers (44, 45) may include around 50 to around 200 alternating first (44) and second (45) layer pairs. A lesser number of layer pairs over a wavelength range may increase transmission at lower wavelength at corresponding incidence angles for a narrow bandwidth source.

Referring to FIG. 1, in some embodiments, the backlight (200) includes an encapsulation layer (60) disposed between the partial reflector (40) and the plurality of discrete light sources (20). The encapsulation layer (60) substantially completely encapsulates the plurality of discrete light sources (20). In some instances, the encapsulation layer (60) may be an optically transmissive dielectric coating over the plurality of discrete light sources (20). In some other instances, the encapsulation layer may be a transparent layer of glue that conforms to the light sources (20). The encapsulation layer (60) improves light coupling from the plurality of discrete light sources, and protects the light sources from physical and environmental influence. In some aspects, the partial reflector (40) may be placed above the encapsulating layer (60) and may or may not be adhered or optically coupled to the encapsulating layer (60). In other aspects, there may be substantially no air gap between the partial reflector (40) and the encapsulation layer (60).

The refractive index of the encapsulation layer can also be tuned to improve illumination uniformity. Lower refractive indices of the encapsulation layer allow light from the light sources (20) to refract at higher angles, aiding the lateral spreading. The refractive index of the encapsulation layer may be between about 1.3 to 1.7, or between about 1.4 to 1.65.

Figure 9:
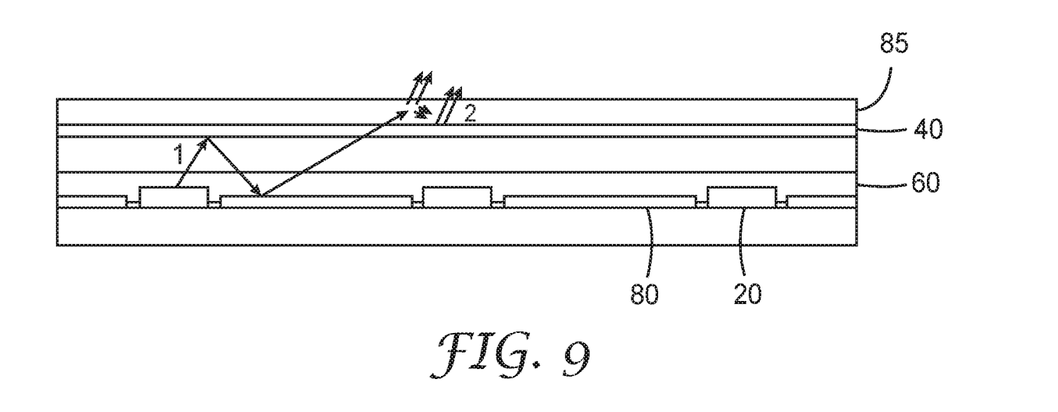
FIG. 9 schematically shows a backlight illumination system according to other aspects of the disclosure.

Additional optical elements and means to attach these elements may be placed above the partial reflector (40) to improve illumination performance. Such components may include, but not restricted to, diffusers, and prism films. For instance, when blue LEDs are used on the circuit board (70), a down conversion layer (85) may be added, as illustrated in FIG. 9. Down conversion layers convert a fraction of the blue light into higher wavelengths (red and green) to achieve white illumination from the backlight arrangement. The down conversion layer may include bulk scattering material to diffuse blue excitation light from the LEDs. The blue diffusion also serves to extract light from the partial reflector (40) at certain output angles. The material of the down conversion layer (85) may be chosen so as to convert a portion of the blue light to red and green to achieve a white-like output. Example of such materials may be red and green phosphors or quantum dots. The blue diffusing materials could include TiO2 nanoparticles in the down conversion layer, or in an adhesive joining the down conversion layer (85) and the partial reflector (40).

The partial reflector (40) reflects blue light incident at low or moderate angles (for example, less than 40 degrees) to spatially extend the excitation light source, while transmitting it at higher angles toward the down conversion layer (85). The partial reflector (40) also reflects green and red light created by the partial conversion of blue light in the down conversion layer (85) back toward the viewer. For the latter purpose of the partial reflector (40), the RBE may exceed at least the green band wavelength, and, in some instance, also the red band wavelength. The two effects are illustrated using arrows in FIG. 9, identified as 1) reflecting blue light over low angle range for light spreading, and transmitting blue at higher angles, and 2) recycling red and green from the down conversion layer (85). The choice of RBE may then be determined by the trade-off between uniformity and overall optical efficiency including each of these effects.

The partial reflector (40), which preferentially transmits light of high incidence angle, provides for wide spatial spreading of the light as it propagates between the partial reflector (40) and the reflection layer (80). In some embodiments, the multilayer polymeric partial reflector (40) includes an optically diffusive structured major surface (46) as schematically shown in FIG. 7. For example, the optically diffusive structured major surface (46) may be formed on the top surface of the partial reflector (40) as a diffuse coating. Higher diffusion may also lead to higher illumination uniformity. Surface roughness of the structured major surface (46) that leads to diffusion may be measured, for example by the Gaussian width s of its surface angle distribution, where s may be 5 degrees, or 10 degrees, or 20 degrees, or 30 degrees, or 40 degrees.

In some embodiments, the backlight includes a reflective polarizer (50) disposed on the partial reflector (40). The reflective polarizer (50) substantially reflects light having one of orthogonal first and second polarization states (e.g., a first polarization state with the electric field along the x-axis) and substantially transmits light having the other of the first and second polarization states (e.g., a second polarization state with the electric field along the y-axis) in a first wavelength range. In some embodiments, for a substantially normally incident light having the blue wavelength (31), the reflective polarizer (50) may be said to substantially reflect light having a first polarization state in the blue wavelength if at least 60% of incident light having the first polarization state in the blue wavelength (31) is reflected through the polarizer (50). In some embodiments, at least 70%, or at least 80%, of incident light having the first polarization state in the blue wavelength is reflected through the polarizer (50). In some embodiments, for a substantially normally incident light having the blue wavelength, the reflective polarizer (50) may be said to substantially transmit light having a second polarization state in the blue wavelength (31) if at least 60% of incident light having the second polarization state in the blue wavelength is transmitted from the reflective polarizer (50). In some embodiments, at least 70%, or at least 80%, of incident light having the second polarization state in the blue wavelength is transmitted from the polarizer (50).

In some embodiments, for at least one red wavelength (33), the multilayer polymeric partial reflector may transmit at least 30% of the substantially normally incident light (32) having the first polarization state and the reflective polarizer may reflect at least 60% of the substantially normally incident light (32) having the first polarization state. In some aspects, the multilayer polymeric partial reflector may transmit at least about 40 to at least about 50% of the incident light and the reflective polarizer may reflect at least about 70 to at least about 80% of the incident light.

The reflective polarizer (50) used in the optical systems of the present description may be any suitable type of reflective polarizer. The reflective polarizer may be a polymeric multilayer optical film that may be substantially uniaxially oriented as described further elsewhere. Substantially uniaxially oriented reflective polarizers are available from 3M Company under the trade designation Advanced Polarizing Film 5 or APF. Other types of multilayer optical film reflective polarizers (e.g., Dual Brightness Enhancement Film or DBEF available from 3M Company) may also be used, which have low reflectivity for light polarized with component along one in-plane axis, and high reflectivity for light polarized with component along the second, orthogonal in-plane axis. In some embodiments, other types of reflective polarizers (e.g., wire-grid polarizers) are used.

In some other embodiments, and with reference to FIG. 1, an optically diffusive layer (100) may be disposed between the multilayer polymeric partial reflector (40) and the reflective polarizer (50) for diffusing light transmitted by the partial reflector (40). The optically diffusive layer (100) may aid in extracting light, to further condition the output light angle distribution, and may partially reflect light back into the partial reflector (40) for further uniform spreading.

Figure 8:
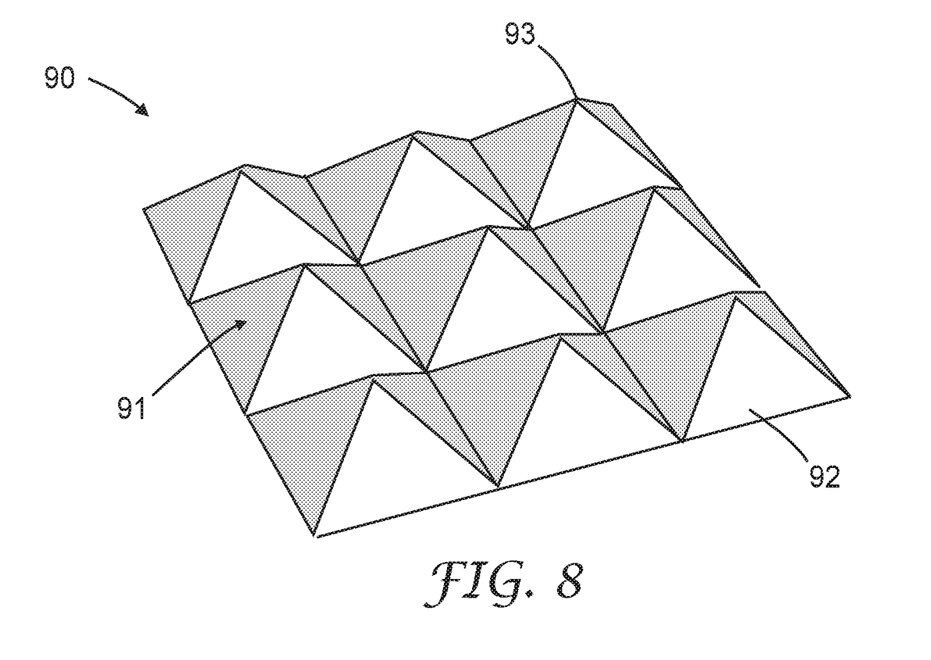
FIG. 8 schematically shows the construction of a layer having prismatic structure disposed above the partial reflector in the backlight illumination system according to some aspects of the disclosure.

In some aspects, to achieve a similar light angle distribution for the blue light impinging on the down conversion layer (85), optical elements may be added above the partial reflector (40) to re-direct high angle light toward the axial direction, followed by diffusion to achieve broad light angle distribution. Such optical elements include a turning film with a top surface diffuser, crossed linear prism films, or an array of prism structures such as clear pyramids or cones. In some embodiments, a prismatic layer (90) may be disposed between the multilayer polymeric partial reflector (40) and the reflective polarizer (50). As illustrated in FIG. 8, the prismatic layer (90) may include an array of regularly arranged prisms (91). Each prism (91) includes a plurality of sides (92) intersecting at a vertex (93). In some aspects, each prism (91) has four equal sides (92). In some embodiments, the vertex (93) faces the partial reflector (40) as best seen in FIG. 1. The prism side surfaces (92) may be curved to improve angle broadening, in some aspects.

Other types of prism films include arrays of pyramid structures, cones, partial spheres (bead coating) or the inverse of such structures. The structures could face toward or away from the array of discrete light sources (20). In another embodiment, the partial reflector (40) may be coated with a diffuse material, and a prismatic layer (90) may be placed above the coating, unattached, with the prism structure facing the array of discrete light sources (20). The diffuse material extracts light from the partial reflector (40), while the prismatic layer re-directs the angle distribution, and re-images the output from the partial reflector (40) to improve uniformity. Images and conoscopic output that provides maximum brightness and good uniformity may be simulated as a function of an apex angle of the prisms. The apex angle may be around 50°-80° for good uniformity and output angle distributions.

The invention claimed is:

1. A backlight for providing uniform illumination to a display panel, comprising:
a plurality of discrete light sources forming an array of rows and columns of discrete light sources, each discrete light source configured to emit an unpolarized blue light at a blue wavelength in a range from about 410 nm to about 470 nm;
a multilayer polymeric partial reflector disposed on the plurality of discrete light sources, for substantially normally incident light and for each of orthogonal first and second polarization states, the partial reflector comprising:
a reflection band comprising the blue wavelength;
a reflectance greater than about 80% at the blue wavelength;
a left band edge between about 370 nm to about 420 nm;
a right band edge between about 500 nm and 600 nm; and
an average transmission between about 20% to about 80% for visible wavelengths greater than the right band edge; and
a reflective polarizer disposed on the partial reflector, for substantially normally incident light having the blue wavelength, the reflective polarizer reflecting at least 60% of the light having the first polarization state and transmitting at least 60% of the light having the second polarization state.

2. The backlight of claim 1, wherein the blue wavelength is in a range from about 430 nm to about 470 nm.

3. The backlight of claim 1, wherein the multilayer polymeric partial reflector comprises a plurality of polymeric layers reflecting or transmitting light primarily by constructive or destructive optical interference.

4. The backlight of claim 3, wherein the plurality of polymeric layers form alternating first and second polymeric layers, the first polymeric layers being substantially isotropic, the second polymeric layers being substantially birefringent and having in-plane indices nx and ny along orthogonal directions, a difference between nx and ny greater than about 0.02.

5. The backlight of claim 3, wherein the polymeric layers comprise one or more of a polycarbonate, a polymethyl methacrylate (PMMA), a polyethylene terephthalate (PET), a glycol-modified polyethylene terephthalate (PETG), a polyethylene naphthalate (PEN), and a PEN/PET copolymer.

6. The backlight of claim 1, wherein the multilayer polymeric partial reflector comprises an optically diffusive structured major surface.

7. The backlight of claim 1 further comprising an encapsulation layer disposed between the partial reflector and the plurality of discrete light sources and substantially completely encapsulating the plurality of discrete light sources, wherein there is substantially no air gap between the partial reflector and the encapsulation layer.

8. The backlight of claim 7, wherein there is substantially no air gap between the partial reflector and the encapsulation layer.

9. The backlight of claim 1, wherein the plurality of discrete light sources are disposed on a circuit board comprising a plurality of electrically conductive traces connected to the discrete light sources for energizing and controlling a light emission of the discrete light sources.

10. The backlight of claim 1 further comprising a reflection layer having a reflectance of at least 60% at the blue wavelength and defining a plurality of through-openings therein, each discrete light source disposed in a corresponding opening.

11. The backlight of claim 1, wherein for substantially normally incident light having the first polarization state and for at least one red wavelength, the multilayer polymeric partial reflector transmits at least 30% of the incident light and the reflective polarizer reflects at least 60% of the incident light.

12. The backlight of claim 1 further comprising a prismatic layer disposed between the multilayer polymeric partial reflector and the reflective polarizer, the prismatic layer comprising an array of regularly arranged prisms, each prism comprising a plurality of sides intersecting at a vertex, the vertex facing the partial reflector, and wherein, each prism comprises four equal sides.

13. The backlight of claim 12, wherein each prism comprises four equal sides.

14. The backlight of claim 1, wherein the display panel is a liquid crystal display panel.

15. The backlight of claim 1, wherein the plurality of discrete light sources comprises a plurality of discrete light emitting diodes (LEDs).

16. The backlight of claim 1, wherein the blue wavelength is about 450 nm.

17. The backlight of claim 1 further comprising an optically diffusive layer disposed between the multilayer polymeric partial reflector and the reflective polarizer for diffusing light transmitted by the partial reflector.

* * * * *